United States Patent [19]
Plastino

[11] 3,758,171
[45] Sept. 11, 1973

[54] VEHICLE TRACK ELEMENT

[76] Inventor: Dominic Plastino, 1315 Jules Poitras, Apt. 418, Ville St. Laurent, Montreal, Quebec, Canada

[22] Filed: Feb. 23, 1971

[21] Appl. No.: 118,129

[30] Foreign Application Priority Data
Jan. 18, 1971  Canada ............................. 102,997

[52] U.S. Cl. .................................... 305/40, 305/37
[51] Int. Cl. ............................................. B62d 55/18
[58] Field of Search .................. 305/37, 40, 43, 41, 305/38, 11, 47, 48

[56] References Cited
UNITED STATES PATENTS

| | | | |
|---|---|---|---|
| 2,351,647 | 6/1944 | Wales | 305/41 |
| 3,345,113 | 10/1967 | Siber | 305/37 X |
| 1,597,389 | 8/1926 | Penn | 305/35 X |
| 2,392,988 | 1/1946 | Keck | 305/38 |

FOREIGN PATENTS OR APPLICATIONS
859,332  6/1940  France ................................ 305/40

Primary Examiner—Richard J. Johnson
Attorney—Fetherstonhaugh & Co.

[57] ABSTRACT

A track of a track laying vehicle consists of a set of identical track elements which are serially connected together by wire rope connectors extending between adjacent elements. An elastomeric seal protectively and supportably encloses portions of the wire rope connectors between opposing side edges of the adjacent track elements. The track elements are kept in alignment by gear teeth provided on each element and received in sockets formed in the adjacent element. The sockets have elastomeric inserts, portions of which serve to seal the space between the opposing side edges of the adjacent elements. Each track element is formed from two complemental parts which are separably secured together and are complementally recessed to accommodate the wire rope connectors.

7 Claims, 5 Drawing Figures

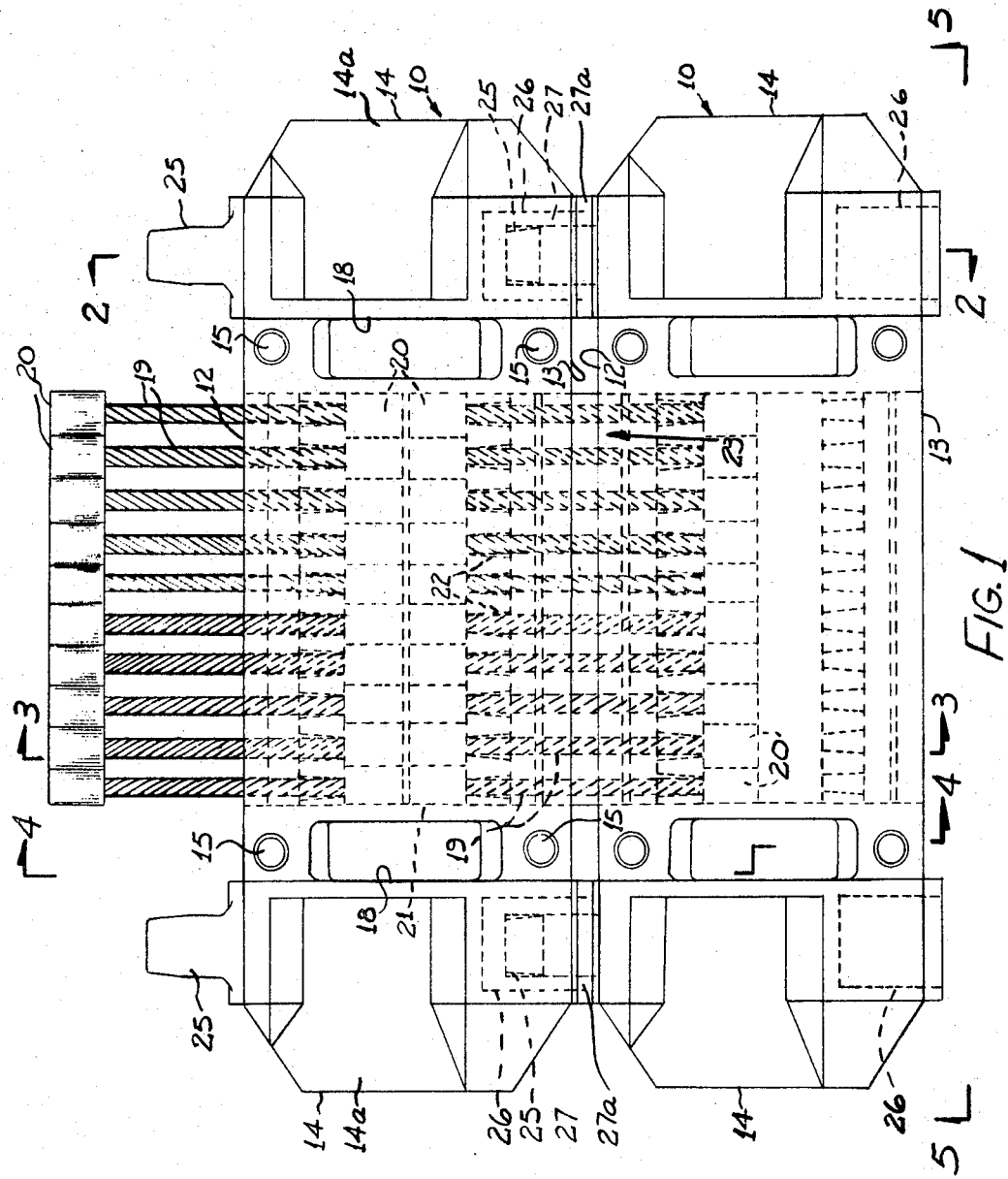

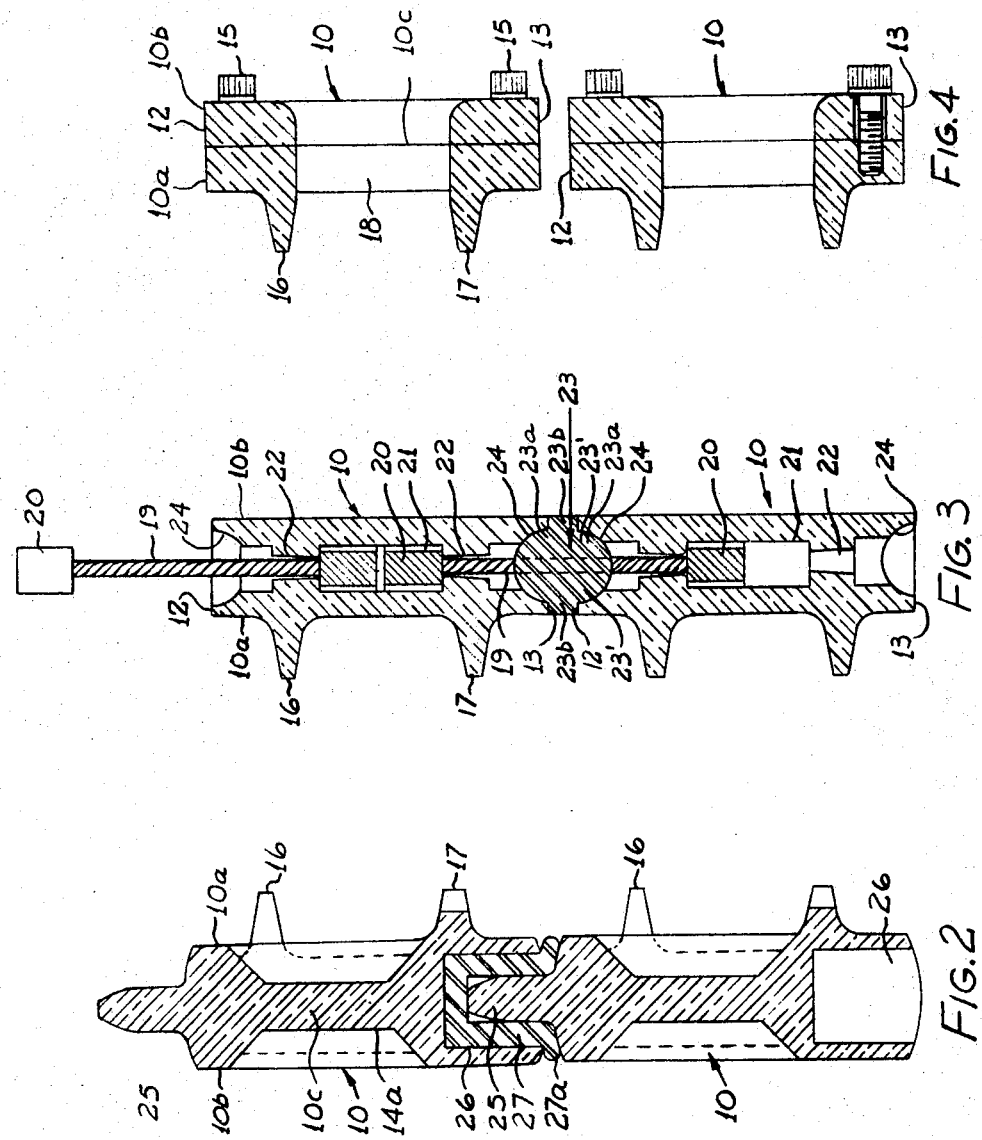

VEHICLE TRACK ELEMENT

This invention relates to new and useful improvements in tracks for track laying vehicles such as tractors, earth moving equipment, military tanks, and the like, wherein the self-laid track consists of a set of identical track elements which are serially connected together, usually by hinge pins, such connection affording the flexibility which is required for the track to pass around sprockets on the vehicle which drive and/or guide the track.

Conventional tracks of this type are subjected to considerable wear, involving the necessity for carrying many spare parts and also necessitating complex mechanism on the vehicle for adjusting tension of the track as it becomes worn. Moreover, the track is noisy in operation, which is particularly objectionable in vehicles of the military type.

The principal object of the invention is to provide an improved track which is simple in construction, easy to adjust and repair, and which affords substantially silent operation with greatly reduced wear. As such, the improved track utilizes identical track elements which are serially connected together by plural wire rope connectors anchored in and extending between every two adjacent elements. This eliminates the conventional hinge pin connections and permits the track to flex in its passage around sprockets and also into conformity with irregularities of the ground.

An important feature of the invention resides in the provision of elastomeric seals, one of which is interposed between every two adjacent track elements and encloses portions of the wire rope connectors which extend therebetween. The seal effectively prevents accumulation of dirt between the track elements and protects the rope connectors against damage by dirt and moisture. Moreover, the elastomeric seal supportably engages the connectors so that they bend in a gradual curve rather than sharply when the track elements pass around the sprockets, and wear on the connectors is thus greatly reduced.

Another important feature of the invention is the provision of improved means for maintaining the track elements in alignment by preventing relative movement thereof transversely of the track. These improved means comprise two gear teeth which project from one side edge of the end portions of each track element into sockets formed in the opposite side edge of an adjacent element. Elastomeric inserts are provided in the sockets for cushioning movement of the gear teeth therein, the inserts including outer portions which also seal the space between adjacent track elements.

The track elements are provided at the underside thereof with a pair of ground engaging ribs, and sprocket tooth receiving holes in the elements are arranged so as to communicate with a space between the ribs. Thus, when the track elements pass around the sprockets, the sprocket teeth push out dirt from the space between the ribs and the track is virtually self-cleaning.

With the foregoing more important object and features in view and such other object and features which may become apparent as this specification proceeds, the invention will be understood from the following description taken in conjunction with the accompanying drawings, wherein like characters of reference are used to designate like parts, and wherein:

FIG. 1 is a plan view showing two adjacent track elements of the invention connected together;

FIG. 2 is a sectional view taken substantially in the plane of the line 2—2 in FIG. 1;

FIG. 3 is a sectional view, taken substantially in the plane of the line 3—3 in FIG. 1;

FIG. 4 is a sectional view, taken substantially in the plane of the line 4—4 in FIG. 1.

Figure 5:
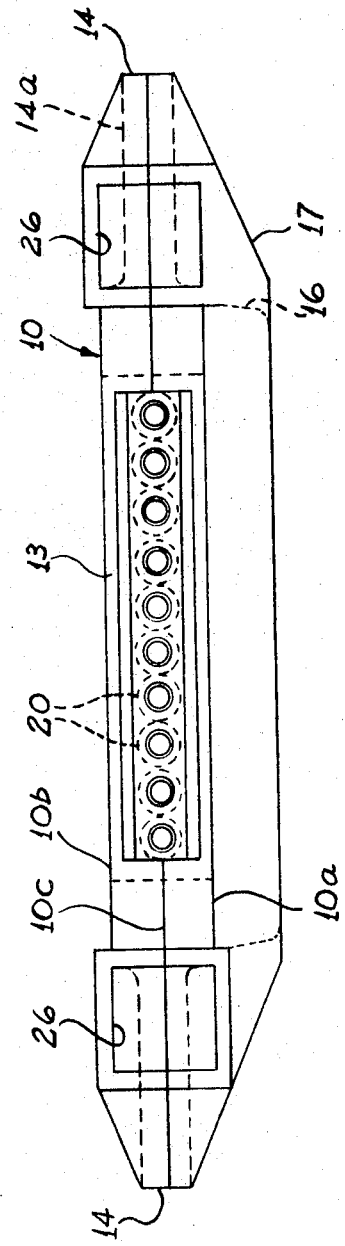
FIG. 5 is a side elevational view, taken in the direction of the arrow 5 in FIG. 1.

Referring now to the accompanying drawings in detail, the vehicle track of the invention consists of a set of identical track elements 10 which are serially connected together, two adjacent such elements being shown in FIGS. 1–4. The track elements are illustrated as being elongated transversely of the track, each element having a pair of side edges 12, 13 and a pair of ends 14, the latter being disposed at the sides of the assembled track. However, if desired, the track elements may be square in plan, or elongated longitudinally of the track rather than transversely as shown.

Each track element 10 consists of a pair of complemental, superposed plate members 10a and 10b which are separably secured together by a plurality of screws 15. The lower plate member 10a which engages the ground may be referred to as the grouser plate, and the upper plate member 10b may be referred to as the cover plate. A pair of downwardly projecting, ground engaging ribs 16, 17 are provided integrally at the underside of the grouser plate 10a. These ribs extend transversely of the track in spaced parallel relation to each other, and also in spaced relation from the side edges 12, 13 of the track element, as will be apparent from FIGS. 3 and 4. Apart from the ribs 16, 17 on the grouser plate 10a, the two plate members 10a, 10b are complementally the same and abut each other at an interface 10c located in a plane substantially in the middle of the thickness of the track element when the plate members are assembled.

Preferably, one of the ribs such as the rib 16 is shorter than the other rib 17, so that when the vehicle is in water, more turbulence is created by having the ribs of different length, and the vehicle is able to travel somewhat faster. The end portions of the track element are provided with holes 18 which extend through both plate members 10a, 10b to receive teeth of sprockets on the vehicle (not shown), around which sprockets the track passes. The holes 18 communicate with the space between the ribs 16, 17, as will be apparent from FIG. 4.

Every two adjacent track elements 10 are flexibly connected together by a set of wire rope connectors 19 provided at their ends with enlarged heads such as ferrules 20 which are firmly secured to the ends of the rope connectors. The central portions of the plate members 10a, 10b are complementally recessed so that when the plate members are assembled, a chamber 21 is formed in which the connector ferrules 20 are firmly held. The plate members are also complementally recessed to provide ducts or passages 22 through which the rope connectors 19 freely pass. The passages 22 extend from the chamber 21 to the side edge 12 of the track element, and another set of such passages extend from the chamber 21 to the side edge 13, it being understood that the chamber 21 accommodates the ferrules 20 of two sets of the connectors 19 for connection of a given track element to adjacent track elements on both sides thereof.

In the assembled track, the edge 12 of each track element 10 is spaced away from the opposing side edge 13 of the adjacent track element, and the rope connectors 19 extend through the space between these opposing edges, thus affording the flexibility which is necessary to permit angular or rotational movement between the adjacent track elements as they pass around the sprockets. One very important feature of the invention resides in the provision of an elastomeric seal 23 which is interposed between the opposing edges 12, 13 of the adjacent track elements and protectively and supportably encloses the connectors 19 in that region.

The seal 23 is elongated and its preferred cross-sectional form is shown in FIG. 3 where it will be noted that the seal has semi-cylindrical side portions 23a which are seated in concave grooves 24 formed in the side edges 12, 13 and also has central rib portions 23b which are in sealing abutment with the side edges 12, 13. The seal is composed of a pair of complemental half-sections 23' which abut each other at the interface 10c and are complementally grooved to accommodate the rope connectors 19. The seal half-sections 23' are held in assembled relation by seating of the seal portions 23a in the grooves 24 of the assembled track elements.

The elastomeric seal 23 between the adjacent track elements serves as an effective shock absorber and substantially reduces noise when the track is in operation. Also, it tightly fills the space between the opposing side edges 12, 13 of the track elements and thus prevents accumulation of dirt in that area, while at the same time protectively enclosing the rope connectors 19 to safeguard the same against damage by dirt and moisture. Moreover, the seal supportably engages the connectors 19 between the edges 12, 13 and these portions of the connectors assume a gradual curvature when the track passes around sprockets, rather than being sharply bent as they would be if the seal were not present. As a combined result, the rope connectors are subjected to little wear and have a long life span before requiring replacement.

Another important feature of the invention resides in the provision of improved means for maintaining the several track elements in alignment by preventing relative movement thereof transversely of the track. These means comprise a pair of gear teeth 25 which are formed integrally on the end portions 14 of each track element and project from the side edge 12 into a pair of sockets 26 formed in the side edge 13 of the adjacent track element, as will be apparent from FIGS. 1 and 2. Each socket 26 is of a rectangular cross-section and contains a rectangular cup-shaped insert 27 of elastomeric material in which the gear tooth 25 is received. The tooth 25 fits tightly into the insert 27 and is thereby protected against dirt and moisture, but it will be apparent from FIG. 2 that the shape of the gear tooth is such that movement of the tooth in the elastomeric insert is possible as the adjacent track elements become angularly offset from each other during their passage around a sprocket. Relative movement of adjacent track elements transversely of the track is, of course, prevented by engagement of the gear teeth 25 with the inserts 27 in the sockets 26, and thus the track elements are maintained in proper alignment.

Each of the inserts 27 includes an outer portion 27a which projects from the socket 26 and seals the space between the opposing side edges 12, 13 of the adjacent track elements, thus further safeguarding the tooth 25 against ingress of dirt and moisture into the socket 26 and insert 27.

When the track is in operation it is virtually self-cleaning. Any dirt which may accumulate in the space between the ribs 16, 17 at the underside of the track element is pressed out and dislodged when the track passes around the sprockets and the sprocket teeth are projected through the aforementioned holes 18. Also, any dirt which may accumulate in the space between the rib 16 of one track element and the rib 17 of the next track element is dislodged by the angular movement of the adjacent track elements as they pass around the sprockets. Of course, the elastomeric seals 23 and the elastomeric insert portions 27a prevent any accumulation of dirt between the track elements themselves.

It may be noted that the end portions 14 of the track element include flat web regions 14a of reduced thickness. If desired, laterally projecting extensions (not shown) may be secured to these web regions to increase the width of the track and afford a greater area of support when the vehicle is used on snow or muskeg.

While in the foregoing there has been described and shown the preferred embodiment of the invention, various modifications and equivalents may be resorted to within the spirit and scope of the invention as claimed.

The embodiments of the invention in which an exclusive property or privilege is claimed are defined as follows.

1. A track for a track laying vehicle, comprising a set of identical track elements serially connected together, each of said track elements having its ends at the sides of the track and also having side edges extending transversely of the track, opposing side edges of every two adjacent elements in the set being spaced away from each other, a plurality of wire rope connectors connecting together every two adjacent elements, said rope connectors having their ends anchored in the respective adjacent elements and extending through the space between said opposing edges of the adjacent elements, an elastomeric seal disposed in the space between every two adjacent elements, said seal protectively and supportable enclosing said plurality of rope connectors, and aligning means provided at the end portions of every two adjacent track elements and cooperating to prevent movement thereof relative to each other transversely of the track, said aligning means comprising a gear tooth provided on each end portion of each track element and received in a socket provided in each end portion of the adjacent track element, and an elastomeric insert provided in the socket of each track element and receiving said gear tooth of the adjacent track element therein.

2. The device as defined in claim 1 wherein said elastomeric insert includes an outer portion projecting from said socket and sealing the space between said opposing side edges of the adjacent track elements.

3. A track element for a track laying vehicle wherein a set of identical track elements are serially connected together to form the track, said track element having ends at the sides of the track and also having side edges extending transversely of the track, and aligning means on said track element for aligning the same with respect to adjacent track elements, said aligning means comprising a gear tooth projecting from one side edge of an end portion of said element, the other side edge of said end portion being provided with a socket for reception of a gear tooth of an adjacent track element whereby to prevent relative movement of adjacent elements transversely of the track, and a tooth-receiving insert of elastomeric material provided in said socket, said elastomeric insert including an outer portion projecting from said socket to seal a space between the side edge of the associated track element and an opposing side edge of an adjacent track element.

4. The device as defined in claim 3 wherein said track element comprises a pair of complemental superposed plate members separably secured together.

5. The device as defined in claim 3 wherein said track element comprises a pair of complemental superposed plate members separably secured together, together with flexible means connecting said track element to an adjacent track element, said connecting means comprising a plurality of wire rope connectors with enlarged heads at each end thereof, said complemental plate members of the track element being recessed so as to form in the assembled track element a cavity in which said heads are disposed and ducts extending from said cavity to one side edge of the plate member through which ducts said rope connectors extend toward an adjacent track element.

6. The device as defined in claim 5 together with an elastomeric seal positionable on said rope connectors between adjacent track elements to protectively and supportably enclose portions of the rope connectors between opposing side edges of adjacent elements.

7. The device as defined in claim 3 together with a pair of spaced ribs extending transversely at the underside of said track element, said element being provided with sprocket tooth receiving apertures communicating with the space between said ribs.

* * * * *